(12) United States Patent
Fujioka et al.

(10) Patent No.: US 6,552,764 B2
(45) Date of Patent: *Apr. 22, 2003

(54) REFLECTIVE LCD WHOSE COLOR FILTER PATTERN EXTENDS OUTSIDE DISPLAY REGION AND WHOSE SEAL OVERLAPS COLOR FILTER

(75) Inventors: Kazuyoshi Fujioka, Osaka (JP); Takayuki Shimada, Nara-ken (JP); Youji Yoshimura, Nara-ken (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,759

(22) Filed: Jul. 21, 1999

(65) Prior Publication Data

US 2002/0075429 A1 Jun. 20, 2002

(30) Foreign Application Priority Data

Jul. 28, 1998 (JP) .............................. 10-213290

(51) Int. Cl.$^7$ ...................... G02F 1/1335; G02F 1/1339
(52) U.S. Cl. ...................... 349/106; 349/110; 349/153
(58) Field of Search .............................. 349/106, 153, 349/110

(56) References Cited

U.S. PATENT DOCUMENTS

| | | | | |
|---|---|---|---|---|
| 4,470,667 A | * | 9/1984 | Okubo et al. | 350/339 |
| 5,128,784 A | * | 7/1992 | Suzuki et al. | 359/58 |
| 5,365,357 A | * | 11/1994 | Ohgawara et al. | 349/106 |
| 5,844,645 A | * | 12/1998 | Kashimoto | 349/106 |
| 5,870,157 A | * | 2/1999 | Shimada et al. | 349/106 |
| 5,898,041 A | * | 4/1999 | Yamada et al. | 522/81 |
| 5,910,829 A | * | 6/1999 | Shimada et al. | 349/110 |
| 5,978,061 A | * | 11/1999 | Miyazaki et al. | 349/155 |
| 6,195,140 B1 | * | 2/2001 | Kubo et al. | 349/44 |

FOREIGN PATENT DOCUMENTS

| | | |
|---|---|---|
| EP | 0 740 182 A2 | 10/1996 |
| JP | 60-243638 | 12/1985 |
| JP | 62-210425 | 9/1987 |
| JP | 64-35527 | 2/1989 |
| JP | 3-148636 | 6/1991 |
| JP | 4-37804 | 2/1992 |
| JP | 7-318929 | 12/1995 |
| JP | 8-201797 | 8/1996 |

(List continued on next page.)

*Primary Examiner*—Robert H. Kim
*Assistant Examiner*—Andrew Schechter
(74) *Attorney, Agent, or Firm*—Nixon & Vanderhye P.C.

(57) ABSTRACT

A liquid crystal display element includes an active matrix substrate; a color filter substrate; a sealing material for attaching the active matrix substrate and the color filter substrate with a predetermined gap maintained therebetween; and liquid crystal injected in the gap between the active matrix substrate and the color filter substrate. The active matrix substrate includes a pixel electrode comprising a reflective conductive material; a switching element connected to the pixel electrode; a gate signal line receiving a driving signal for driving the switching element; and a source signal line receiving a display signal. A plurality of said pixel electrodes and a plurality of said switching elements are arranged in a matrix, and a plurality of said gate signal lines and a plurality of said source signal lines are arranged so as to intersect each other. The color filter substrate includes a color filter having a plurality of color layers corresponding to a plurality of colors; a display region; and a frame region positioned on the outer periphery of the display region, the plurality of color layers being formed in the display region and in the frame region.

16 Claims, 18 Drawing Sheets

FOREIGN PATENT DOCUMENTS

| | | |
|---|---|---|
| JP | 8-278507 | 10/1996 |
| JP | 9-211493 | 8/1997 |
| JP | 9-292628 | 11/1997 |
| JP | 9-304793 | 11/1997 |
| JP | 9-311351 A | 12/1997 |
| JP | 9-325360 | 12/1997 |
| JP | 10-62768 A | 3/1998 |
| JP | 10-62769 | 3/1998 |
| JP | 10-186404 | 7/1998 |

* cited by examiner

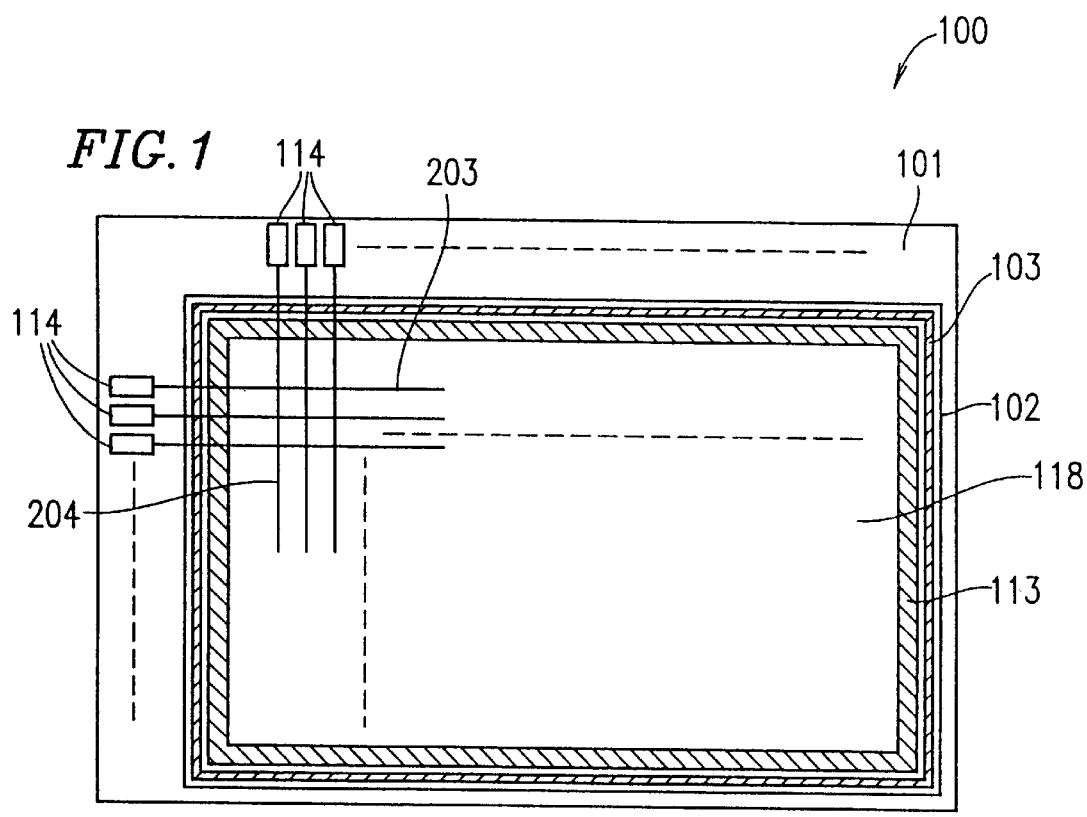

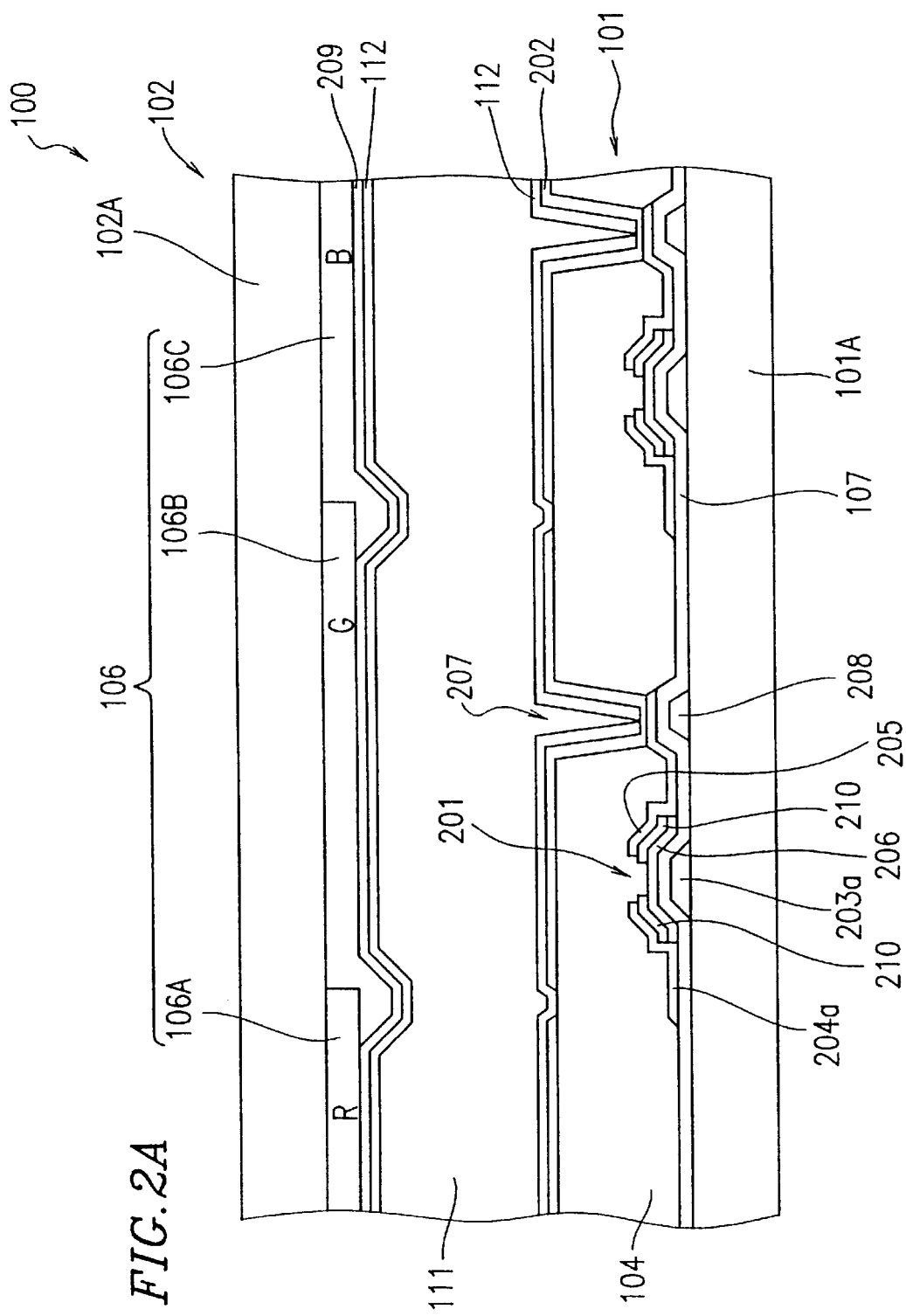

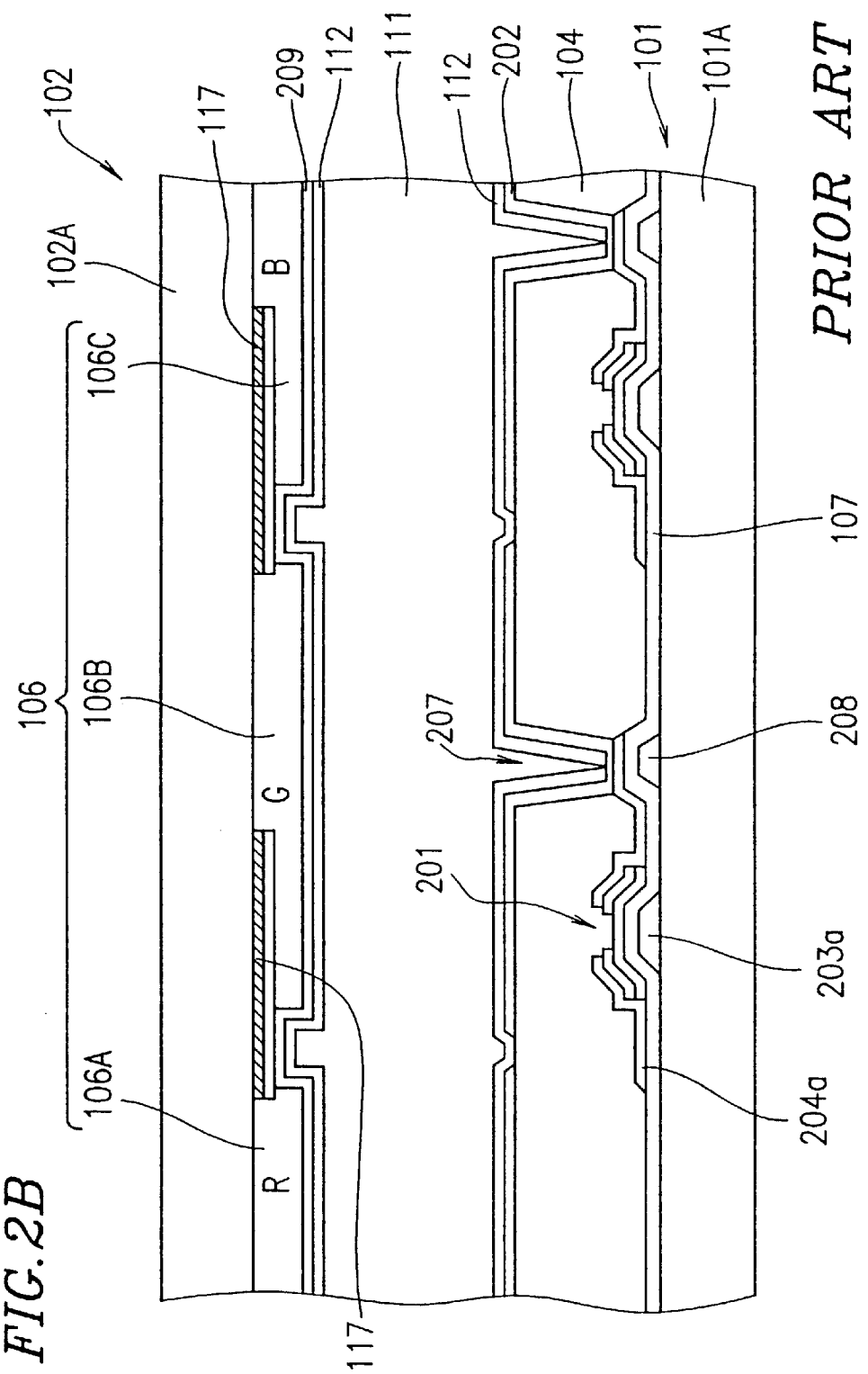

FIG.10B

| | Overlap ratio SO of the RGB pattern with respect to the sealing material (%) | | | | | |
|---|---|---|---|---|---|---|
| | 0 | 30 | 40 | 50 | 75 | 100 |
| Thickness of the sealing material (μm) 4 | × | × | × | × | × | × |
| 4.5 | △ | △ | × | × | × | × |
| 5 | ○ | ○ | ○ | ○ | × | × |
| 5.5 | ○ | ○ | ○ | ○ | × | × |
| 6 | ○ | ○ | ○ | ○ | △ | × |
| 6.5 | ○ | ○ | ○ | ○ | ○ | ○ |
| 7 | ○ | ○ | ○ | ○ | ○ | ○ |

○ ··· No separation phenomenon of the resin component of the sealing material

△ ··· Separation phenomenon of the resin component of the sealing material occurred in a several panels × ··· Separation phenomenon of the resin component of the sealing material occurred in all panels

FIG.11

| Overlapping ratio of the frame region with respect to the width of the sealing material | Appropriate diameter of the spacer in the sealing material |
|---|---|
| 0% | 6.0μm |
| 10% | 5.7μm |
| 20% | 5.4μm |
| 30% | 5.0μm |
| 40% | 4.7μm |
| 50% | 4.5μm |
| 75% | 4.5μm |
| 100% | 4.5μm |

REFLECTIVE LCD WHOSE COLOR FILTER PATTERN EXTENDS OUTSIDE DISPLAY REGION AND WHOSE SEAL OVERLAPS COLOR FILTER

BACKGROUND OF THE INVENTION

1. Field of the Invention

The present invention relates to a liquid crystal display element to be used as a display device for, e.g., television sets, personal computers, word processors, and OA (Office Automation) apparatuses. In particular, the present invention relates to a liquid crystal display element which has a reflection type display mode.

2. Description of the Related Art

As disclosed, for example, in Japanese Laid-Open Publication No. 9-311351, a conventional liquid crystal display element has a pair of insulative substrates usually made of glass. Active elements such as TFTs (thin film transistors) are placed on one of the substrates as switching elements for controlling the electro-optical characteristics of the liquid crystal. Gate signal lines receiving a driving signal for driving the switching elements and source signal lines receiving a display signal are disposed in such a manner that they intersect each other.

Furthermore, on the substrate having TFTs (hereinafter, referred to as an "active matrix substrate"), an inter-layer insulation film is formed over the TFTs and both signal lines, and pixel electrodes are further placed on the insulation film so that the pixel electrodes overlap with the TFTs and the signal lines. By constructing such a structure, light entering any region in which a signal voltage is not applied to the liquid crystal is blocked by both signal lines. Therefore, it becomes unnecessary to provide a black matrix (hereinafter, referred to as a "BM") which has been conventionally provided in a display region of the other substrate (hereinafter, referred to as a "CF substrate") on which a color filter is provided. Moreover, it is known that, in this structure, the entire portion excluding the gate signal lines, source signal lines, and TFTs can be utilized as display pixels, thereby improving the opening ratio of the liquid crystal display element.

Japanese Laid-Open Publication No. 10-62768 discloses a structure, as an implementation of the liquid crystal display element disclosed in the above mentioned Japanese Laid-Open publication No. 9-311351, in which a light-blocking member is provided between gate signal lines and source signal lines on an active matrix substrate so as to block light without providing a BM in a frame region on the outer periphery of a display region. In this structure, an increase in production steps resulting from the light-blocking member can be avoided by forming the portion of the light-blocking member between the source signal lines from the same material that is used for the gate signal lines, and the portion of the light-blocking member between the gate signal lines from the same material that is used for the source signal lines. Furthermore, color layers of a color filter on a CF substrate are formed so as to extend to the frame region, thereby concealing the wiring pattern and the like on the active matrix substrate.

In accordance with the above-described conventional technique, it is possible to produce a CF substrate from only three layers of R (red color), G (green color), and B (blue color), instead of the conventionally-required four layers, namely R, G, B and a BM (black matrix) thereby enabling a significant reduction in the production cost of the CF substrate.

The active matrix substrate and the CF substrate are usually attached together with a sealing material. When attaching, spacers are placed within the sealing material and on either one of the active matrix substrate and the CF substrate in order to provide a predetermined gap between the active matrix substrate and the CF substrate. In the case of a TN-mode liquid crystal display element, the gap between the two substrates is usually about 4 $\mu$m to about 6 $\mu$m, with a variation of about ±10%. Then a liquid crystal is injected by vacuum injection through an injection hole provided in a portion of the sealing material. By closing the injection hole with an UV setting resin, the liquid crystal display element is accomplished.

The above-described conventional technique, which is directed toward transmission type liquid crystal display elements having pixel electrodes formed of a transparent conductive material (i.e., a conductive material having a relatively high transmittance), provides a method for producing a CF substrate having only three layers of R, G, and B, while a BM is provided on the active matrix substrate. As a result, the production cost of the liquid crystal display element is significantly reduced.

However, in the case of a reflection type liquid crystal display element, pixel electrodes made of a reflective conductive material (i.e., a conductive material having a relatively high reflectance) are formed on the active matrix substrate, and images are displayed by controlling the reflection of light entering the surface of the liquid crystal display element. For this reason, it is necessary to suppress the reflection of light in the region which is irrelevant to the display function. Conventionally, suppression of such reflection of light has been accomplished by providing a BM which is composed of a light absorption film or a low-reflectance film on the CF substrate. Thus, in order to construct a CF substrate which does not include a BM but only includes three layers of R, G, and B, or complementary colors of C (cyan), M (magenta), and Y (yellow), it is essential to consider how to suppress the reflection of light in the regions irrelevant to the display function.

In the display region, gate signal lines receiving a driving signal for driving TFTs and source signal lines receiving a display signal are inevitably noticeable between adjacent pixel electrodes. Thus, the first problem to be solved is how to suppress light reflection on these signal lines.

The second problem to be solved is how to suppress light reflection on each signal line in the frame region on the outer periphery of the display region.

The third problem to be solved is how to protect the TFT elements from external light. If light energy enters a channel layer of a TFT element, a leakage current (photo-leakage current) is generated in an off-state of the TFT. This prevents a sufficient voltage from being applied to liquid crystal layer, and prevents the TFT element from displaying images properly. However, a reflection type liquid crystal display element is expected to operate under a maximum illuminance of 100,000 lx in the direct sunlight. In other words, a reflection type liquid crystal element may be subjected to light having a maximum of one hundred fold energy as compared to the 10,000 lx which a conventional transmission type liquid crystal display element may be subjected to, or the 1,000 lx (light energy commonly observed in an office during the daytime) which most-widely-used notebook type PCs may be subjected to. Thus, the TFT elements must be protected from light by a material whose ability to block light is equal to or greater than that of a conventional BM.

SUMMARY OF THE INVENTION

According to one aspect of the invention, a liquid crystal display element includes an active matrix substrate; a color filter substrate; a sealing material for attaching the active matrix substrate and the color filter substrate with a predetermined gap maintained therebetween; and liquid crystal injected in the gap between the active matrix substrate and the color filter substrate. The active matrix substrate includes a pixel electrode comprising a reflective conductive material; a switching element connected to the pixel electrode; a gate signal line receiving a driving signal for driving the switching element; and a source signal line receiving a display signal. A plurality of said pixel electrodes and a plurality of said switching elements are arranged in a matrix, and a plurality of said gate signal lines and a plurality of said source signal lines are arranged so as to intersect each other. The color filter substrate includes a color filter having a plurality of color layers corresponding to a plurality of colors; a display region; and a frame region positioned on the outer periphery of the display region, the plurality of color layers being formed in the display region and in the frame region.

In one embodiment of the invention, said pixel electrode is formed so as to cover said switching element.

In another embodiment of the invention, the plurality of color layers include a red color layer, a green color layer, and a blue color layer; and at least one pair of color layers selected from the red color layer and the green color layer; the red color layer and the blue color layer; and the green color layer and the blue color layer is deposited at a position corresponding to the switching element.

In still another embodiment of the invention, at least one of said gate signal line and said source signal line comprises a transparent conductive film.

In still another embodiment of the invention, one or more further layer is deposited on at least one of said gate signal line and said source signal line including the transparent conductive film. The one or more further layer comprises at least one film selected from a light-transmissive oxide film and a light-transmissive nitride film.

In still another embodiment of the invention, adjacent color layers among the plurality of color layers are deposited at a position corresponding to at least one of said gate signal line and said source signal line.

In still another embodiment of the invention, the plurality of color layers formed in the frame region are arranged so as not to overlap the sealing material.

In still another embodiment of the invention, the plurality of color layers formed in the frame region are arranged so as to overlap the sealing material, the sealing material having a thickness of equal to or greater than about 5 µm.

In still another embodiment of the invention, the plurality of color layers formed in the frame region are arranged so as to overlap the sealing material, an overlapping width between the plurality of color layers and the sealing material accounting for less than about 50% of a width of the sealing material.

In still another embodiment of the invention, the sealing material comprises a thermosetting resin and includes a first portion in which the sealing material does not overlap with the plurality of color layers formed in the frame region, the first portion having a thickness of equal to or greater than about 5 µm.

In still another embodiment of the invention, the plurality of color layers formed in the frame region and the plurality of color layers formed in the display region are constructed in the same sequence of colors and in the same pitch.

In still another embodiment of the invention, said pixel electrode further comprises a transparent conductive material.

In still another embodiment of the invention, the active matrix substrate further includes a light-blocking member.

In still another embodiment of the invention, the light-blocking member is provided in a region having an area wider than a region where the plurality of color layers formed in the frame region are provided.

According to the present invention, in a liquid crystal display element having a reflection type display mode, a CF substrate can be formed only with three layers of R, G, and B or complementary colors of C, M, and Y, while omitting a BM (which would be conventionally provided for suppressing light reflection in regions irrelevant to the display function). Furthermore, according to the present invention, it is possible to achieve suppression of the reflection of light in the regions irrelevant to the display function, (as would conventionally have been attained by a BM), as well as protecting switching elements from external light.

With respect to the aforementioned first problem to be solved, as disclosed in e.g., Japanese Laid-Open Publication No. 9-292698, a light-transmissive nitride film (e.g., TaN) may be provided on a metal wiring material (e.g., Ta) forming the gate signal lines and the source signal lines, or a transmissive oxide film (e.g., CrO) may be provided on a metal wiring material (e.g., Cr), so as to reduce the light reflectance on each signal line. Alternatively, the gate signal lines and the source signal lines can be formed of a transparent conductive film (e.g., ITO (Indium Tin Oxide)), thereby reducing the reflectance of the lines themselves. In such a structure, the gate signal lines and the source signal lines positioned between adjacent pixel electrodes can be prevented from being noticeable.

Furthermore, if necessary, the color layers of the CF substrate can be positioned in such a manner that adjacent color layers overlap with each other on each signal line. As a result, light which is incident on each signal line is reduced so that the reflection of that light can in turn be lowered.

The above-described measure may not necessarily be required for reflection type liquid crystal display element for the following reasons: A reflection type liquid crystal display element commonly employs a display mode in which a black image is displayed with the application of an electric field. Accordingly, in a reflection type liquid crystal display element, a voltage which is equal to or greater than about −10 V is always applied to the gate signal lines in a non-writing status, and a voltage of about +6 V is always applied to the gate signal lines in a writing status. As a result, the portions above the gate signal lines are substantially displaying a black image, and thus, the above-described measure may not necessarily be required.

Next, with respect to the above-described second problem to be solved, the light reflection in the frame region is reduced by forming color layers in the frame region of the CF substrate. Such color layers in the frame region are patterned using the same material used for the color layers of the color filter provided in the display region, simultaneously with that color layer. Accordingly, no additional production step is required. In this case, it is preferable to omit a light-blocking member as disclosed in Japanese Laid-Open Publication No. 10-62768 because such a light-blocking member, provided on the active matrix substrate in order to block light entering a region between the gate signal lines and the source signal lines, would result in an undesirable increase in the reflectance.

Furthermore, as described above, by providing an oxide film or a nitride film on the metal wiring material, or by reducing the reflectance on the signal lines with the use of a transparent conductive film, the light reflection can be further decreased.

Lastly, the above-described third problem can be solved by providing pixel electrodes in such a manner as to cover the switching elements (TFTs). Since Al or Ag, both of which have a high reflectance, is used for pixel electrodes in a reflection type liquid crystal display element, the light irradiating the TFT can be reduced to a level on the order of several %, thereby enabling protection of the TFTs from the external light.

Moreover, since a channel layer of a TFT is sensitive to light having a short wavelength, it becomes possible to suppress the photo-leakage current by providing at least G or R on the TFT (in the case where the CF substrate is formed of color layers of R, G, and B).

However, the aforementioned technique of addressing the second problem, which involves forming a color layer which is the same as that of color filters in the frame region may result in the following problems:

Generally, in a liquid crystal display element, a thermo-setting resin or a UV setting resin is employed as a sealing material. As a method for coating such a resin on a sealing structure, a screen printing method, a relief printing method, a dispenser coating method or the like can be used. In any one of these methods, the viscosity of the resin material is adjusted so as to obtain an optimum level of viscosity for coating. Such viscosity adjustment is usually achieved by adding silicon oxide or alumina having a particle diameter of about 1 $\mu$m to about 3 $\mu$m, referred to as a filler. The resin is applied on either the active matrix substrate or the CF substrate by using the above-described coating method, with spacers (diameter: about 5 $\mu$m) being employed for maintaining a predetermined gap (i.e., cell thickness) for the liquid crystal layer.

On the other substrate, usually, spacers having a diameter of about 5 $\mu$m are spread in the amount of about 100 units/mm$^2$ to maintain a uniform gap at the portion of the liquid crystal layer which corresponds to the display region. The pair of substrates are then aligned, with a sufficient load being applied to retain the predetermined gap (note that the load depends on the size of the substrate, the area and viscosity of the sealing resin, and the like). Then, the substrates are subjected to a heat treatment or UV ray application, depending on the curing conditions of the particular sealing material used.

Since the above-described filler and spacers are mixed as additives in the sealing material, if the load application is performed under inappropriate conditions (e.g., if the application time before reaching a predetermined load is inadequate (i.e., inadequate load application speed), or if the thickness of the sealing material is extremely compressed to about twice the filler diameter or less), a phenomenon may be observed in which a low-viscosity resin component within the sealing material is separated from the additives and begins to flow.

Moreover, in the case of a thermosetting resin, which sets in response to the application of heat, the resin first reaches its softening point before the setting reaction starts, so that the viscosity of the resin material may drastically decrease at the softening point. Thus, a thermosetting resin is even more susceptible to the separation phenomenon of the above-described resin component and the additives. The separation phenomenon is not in itself a direct cause of a defective liquid crystal display element, but, when the separated resin component flows out to the display region, it may occasionally result in a defect.

In the present invention, by constructing the frame region and the sealing material so that they overlap with each other, the thickness of the sealing material can be reduced as compared to that of the conventional liquid crystal display element in which a BM is provided in the frame region of the CF substrate. For example, a conventional liquid crystal display element typically incorporates a BM which is formed of a metal material such as Cr to a thickness of about 0.3 $\mu$m, whereas the color layer provided according to the present invention is about 1.5 $\mu$m thick, resulting in a difference of 1.2 $\mu$m in the sealing material. As will be appreciated, a thinner sealing material may more readily induce the above-described problem of extreme compression.

Moreover, a reflection type liquid crystal display element has an optical path length which is twice an optical length of a transmission type liquid crystal display element. Accordingly, the cell thickness is required to be reduced to ½ of that of a transmission type liquid crystal display element, which in turn reduces the thickness of the sealing material by about ½. This induces the separation phenomenon of the resin component of the sealing material and the additives, as illustrated above.

Therefore, in order to prevent such a phenomenon, in which a low-viscosity resin component within the sealing material is separated from the additives and begins to flow at the portion where the color layer of the frame region and the sealing material overlap, the present invention prescribes a defined range of thicknesses of the sealing material and a defined range of overlap ratios of the color layer in the frame region with respect to the width of the sealing material.

Specifically, the color layer in the frame region and the sealing material are arranged so as not to overlap with each other at all. Alternatively, even if the color layer in the frame region and the sealing material made of thermosetting resin overlap with each other, it is ensured that the thickness of the sealing material in the overlapping region is equal to or greater than about 5 $\mu$m. Alternatively, it is ensured that the overlapping width between the color layer in the frame region and the sealing material is lower than about 50% of the width of the sealing material, while ensuring that the thickness of the sealing material in the non-overlapping region is equal to or greater than about 5 $\mu$m. As a result, the defects in the sealing material can be minimized.

The color layers in the above-described frame region are preferably formed so as to have the same sequence of colors and the same pitch as those of the color filter in the display region. As a result, since the color arrangement becomes uniform in the frame region, the appearance of the display region can be further improved.

A liquid crystal display element can also be structured in such a manner that the above-described pixel electrodes are formed of at least two or more materials, such as a transparent conductive material (conductive material with a relatively high transmittance) and a reflective conductive material (conductive materials with a relatively high reflectance), thereby providing a liquid crystal display element having two or more types of display modes, i.e., a transmission mode and a reflection mode.

When a liquid crystal display element has a transmission mode and a reflection mode, it is preferable in the transmission mode that a light-blocking member be provided on the active matrix substrate especially in the frame region, as disclosed to Japanese Laid-Open Publication No. 10-62769.

Furthermore, by providing the light-blocking member in a region having a wider area than that of the color layer in the frame region on the above-described CF substrate, it is possible to further block the light from a back light means which enters obliquely due to the thickness of the glass insulative substrate.

Thus, the invention described herein makes possible the advantage of providing a liquid crystal display element having a reflection type display mode, in which the CF substrate is formed only with three layers of R, G, and B or alternatively with three complementary layers of C, M, and Y, thereby making it possible to omit a BM as in the case of a transmission type liquid crystal display element, so as to realize a significant reduction in the production cost.

This and other advantages of the present invention will become apparent to those skilled in the art upon reading and understanding the following detailed description with reference to the accompanying figures.

BRIEF DESCRIPTION OF THE DRAWINGS

FIG. 1 is a plan view illustrating a liquid crystal display element according to each example of the present invention.

FIG. 2A is a cross-sectional view illustrating a display region of a liquid crystal display element according to Example 1 of the present invention.

FIG. 2B is a cross-sectional view illustrating a display region of a conventional liquid crystal display element.

FIG. 10B is a table illustrating a phenomenon where a resin component of the sealing material is separated according to Example 3 of the present invention.

FIG. 11 is a diagram illustrating a measurement of a spacer diameter according to Example 4 of the present invention.

DESCRIPTION OF THE PREFERRED EMBODIMENTS

Figure 3:
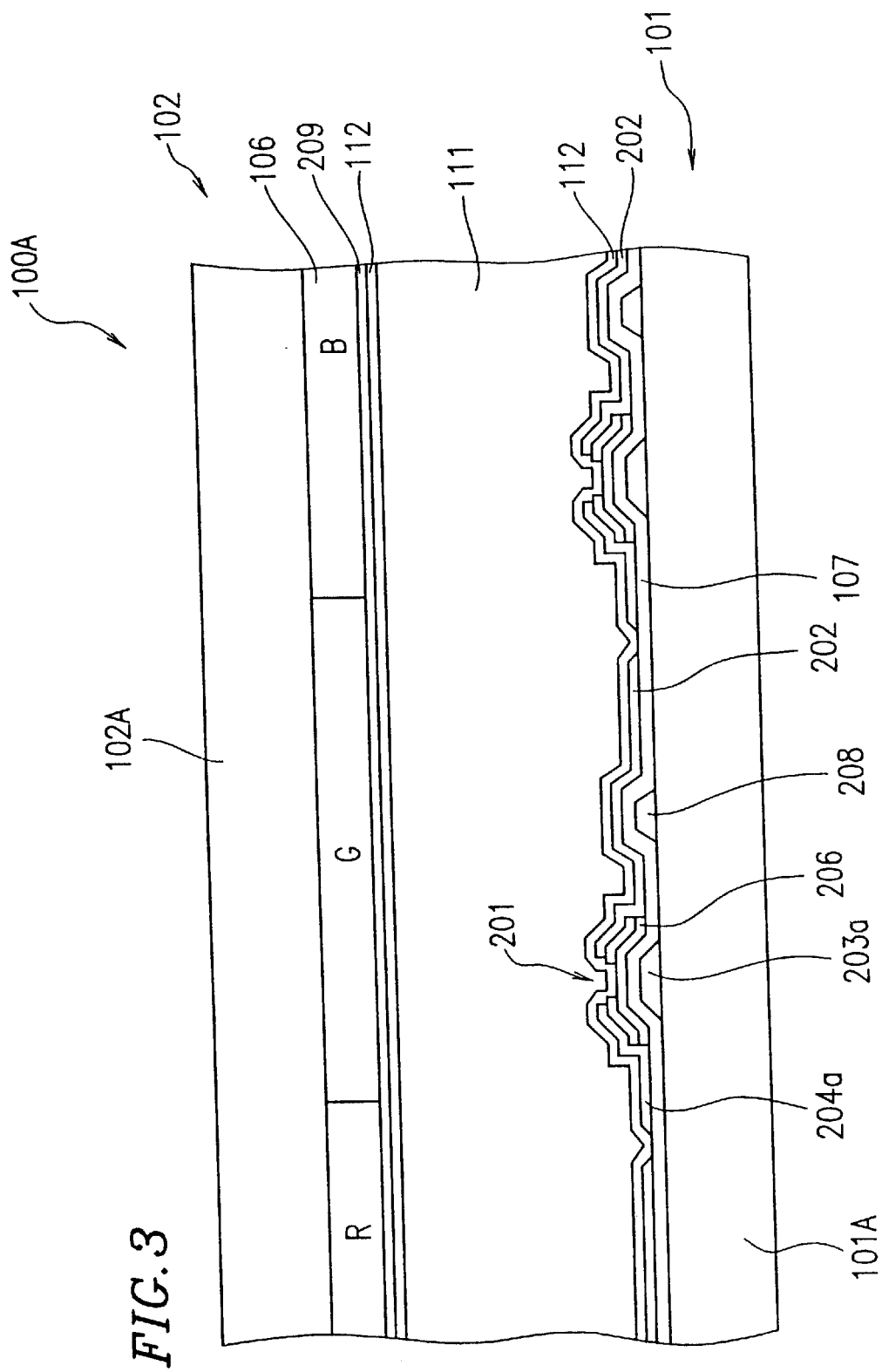
FIG. 3 is a cross-sectional view illustrating a display region of another liquid crystal display element according to Example 1 of the present invention.

Hereinafter, embodiments of the present invention will be described with reference to the drawings.

EXAMPLE 1

FIG. 1 is a plan view illustrating a liquid crystal display element 100 according to Example 1 of the present invention.

The liquid crystal display element 100 includes an active matrix substrate 101 on which pixel electrodes formed of a reflective conductive material and TFTs as switching elements are provided in a matrix, and a CF substrate 102 on which a counter electrode and a color filter are provided. The active matrix substrate 101 and the CF substrate 102 are arranged so as to face each other with a liquid crystal layer interposed therebetween. The portion where the pixel electrodes and the counter electrode are facing each other defines a display region 118, and an outer periphery thereof defines a frame region 113. A sealing material 103 is further provided on the periphery of the frame region 113.

On the active matrix substrate 101, gate signal lines 203 which receive a signal for driving the TFTs and source signal lines 204 which receive a display signal are provided in such a manner that the gate signal lines 203 and the source signal lines 204 intersect each other while passing through the vicinity of each pixel electrode as observed in the plan view. Both signal lines are formed so as to extend beyond the frame region 113 so that a driving signal voltage for driving the TFTs and a signal voltage are respectively input to the gate signal lines 203 and the source signal lines 204 through input terminals 114 provided in a terminal region located outside the frame region 113.

FIG. 2A is a cross-sectional view of the display region 118 of the liquid crystal display element according to the present invention.

Hereinafter, an exemplary structure of the active matrix substrate 101 will be described.

The active matrix substrate 101 includes an insulative substrate 101A formed of glass or the like, onto which gate electrodes 203a branched off the gate signal lines 203 and a channel layer 206 are formed with a gate insulation film 107 interposed therebetween. A contact layer 210 is formed on the both ends of the channel layer 206. Source electrodes 204a branched off the source signal lines 204 and drain electrodes 205 are provided on the channel layer 206 via the contact layer 210 so as to form the TFTs 201. On the TFTs 201, a thin film of photosensitive acrylic resin having a thickness of 3 $\mu$m is formed as an inter-layer insulation film 104 by the spin coat method. Parasitic capacity wiring 208 has a contact hole 207 opened to reach the drain electrodes 205. Then, a conductive material with a high reflectance, such as Al or the like, is formed as pixel electrodes through spattering, and patterned over the insulation film 104 and the contact hole 207. The pixel electrodes 202 are connected to the drain electrodes 295 of the TFTs through the contact hole 207 of the inter-layer insulation film 104. An orientation film 112 is further provided on the pixel electrodes.

In the thus structured active matrix substrate 101, the pixel electrodes 202 are formed of a conductive material having a high reflectance overlap with the TFTs 201, the gate signal lines 203 and the source signal lines 204, via the inter-layer insulation film 104. As a result, it becomes possible to protect the channel layers 206 of the TFTs 201 from the external light. In the present example, pixel electrodes 202 made of Al were formed to be about 200 nm thick, and a light transmittance of about 2.2% is provided. Since pixel electrodes 202 are arranged so as to overlap with the gate signal lines 203 and the source signal lines 204, the area of the pixel electrodes 202 can be maximized, thereby contributing to a brighter display.

Next, an exemplary structure of the CF substrate 102 is described.

The CF substrate 102 includes an insulative substrate 102A made of glass or the like, on which color layers 106 of a color filter are provided. The color layers 106 include three layers of 106A, 106B, and 106C respectively corresponding to three different colors, namely R, G, and B. On the color layer 106, the counter electrode 209 and the orientation film 112 are provided.

In the thus-structured CF substrate 102, any two adjacent color layers among the three color layers of 106A, 106B, and 106C overlap with each other in the region above the source signal lines 204. As a result of such an arrangement, light entering the source signal lines 204 can be reduced. The transmittance becomes greatest at the portion where the color layers 106A of R and 106B of G overlap, exhibiting a transmittance of about 33%. Such a high transmittance is attributable to the fact that, in a reflection type liquid crystal display element, light passes through the color layer of the CF substrate 102 two times in order to display the color, which requires a reflection type liquid crystal display element to be designed with a transmittance twice that of the conventional transmission type liquid crystal display element. In the present example, Ta is used for the source signal lines 204, and a reflectance of Ta is about 60%. Furthermore, a polarizing plate is provided on the CF substrate 102 on the face thereof through which light enters. When the 33% transmittance of the polarizing plate is taken into consideration, the substantial reflection of light equals about 2.2% of the incident light. An ECB mode, which is a display mode used commonly in a reflection type liquid crystal display element, provides a contrast ratio of about 10:1 to about 20:1. Accordingly, the reflectance of about 2.2%, which is equivalent to a contrast ratio of about 45:1, provides sufficient display quality.

By providing TaN over the Ta forming the source signal lines 204, the reflectance on the source signal lines can be further reduced to about 6%. Moreover, the total reflectance is calculated to improve greatly to about 0.22%. When the above-described sample was subjected to an actual measurement, the resultant value read about 0.23%. A glass substrate is used as a reference in this measurement, and a reflection on the surface of the glass substrate is not included.

In the case of the conventional liquid crystal display element having a low reflection BM 117 which is formed by a deposition of Cr and CrO, as shown in FIG. 2B, the same reflectance measurement read about 0.3%. Thus, it will be seen that, in the present example, the reflection on the source signal lines 204 is sufficiently reduced without even providing a BM.

Moreover, in the case where ITO is used for the source signal lines 204, the surface reflection of the source signal lines 204 becomes about 6%. Thus, a significant reflection reducing effect can similarly be expected also in this case.

It will be appreciated that the present invention is also applicable to a liquid crystal display element 100A where pixel electrodes 202 are arranged so as not to overlap the gate signal lines 203 or the source signal lines 204, as shown in FIG. 3. Additionally, the present application is also applicable to a structure in which pixel electrodes are formed to have convex and concave portions, as disclosed in Japanese Laid-Open Publication No. 9-258219.

EXAMPLE 2

The frame region in the liquid crystal display element of Example 1 will be described in the present example.

Figure 4:
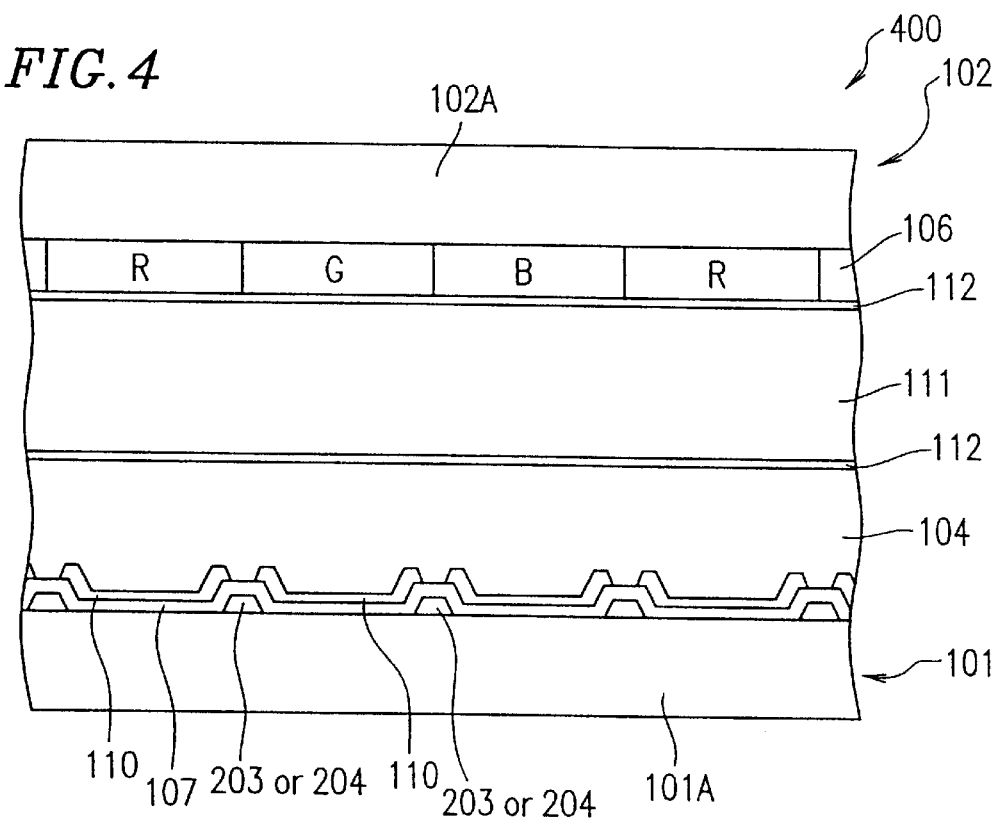
FIG. 4 is a cross-sectional view illustrating a frame region of a conventional liquid crystal display element.

Japanese Laid-Open Publication No. 10-62768 discloses a technique in which a light blocking member 110 is provided between signal lines (i.e., the gate signal lines 203 and the source signal lines 204) on an active matrix substrate of a transmission type liquid crystal display element 400, as shown in FIG. 4. Such a light-blocking member can be employed instead of providing a BM in the frame region 113 on the outer periphery of the display region 118. Moreover, in the same technique, the color layers 106 on the CF substrate 102 are formed so as to extend to the frame region 113. Thus, wiring patterns and the like on the active matrix substrate 101 are concealed. However, unlike a transmission type liquid crystal display element, the color layers of the color filter in a reflection type liquid crystal display element are designed so that light passes through the color layers two times, i.e., once when light enters and once when light is being reflected. Accordingly, in order to obtain in those two times the same color purity as for a transmission type liquid crystal display element, a reflection type liquid crystal display element uses color layers having a transmittance which is twice the transmittance of the color layers in a transmission type liquid crystal display element. For example, the transmittance of R, G, and B may be respectively, about 60%, about 66%, and about 55%, in an actual measurement.

When a structure which is the same as the conventional technique is employed, reflection occurs on the signal lines (i.e., the gate signal lines 203 and the source signal lines 204) and the light-blocking member 110 (formed of a metal material) in the entire frame region 113, and if, for example, Ta (reflectance 60%) is used to form the signal lines as in the case of Example 1, the reflectance in the frame region 113 becomes as high as about 22%.

Figure 5:
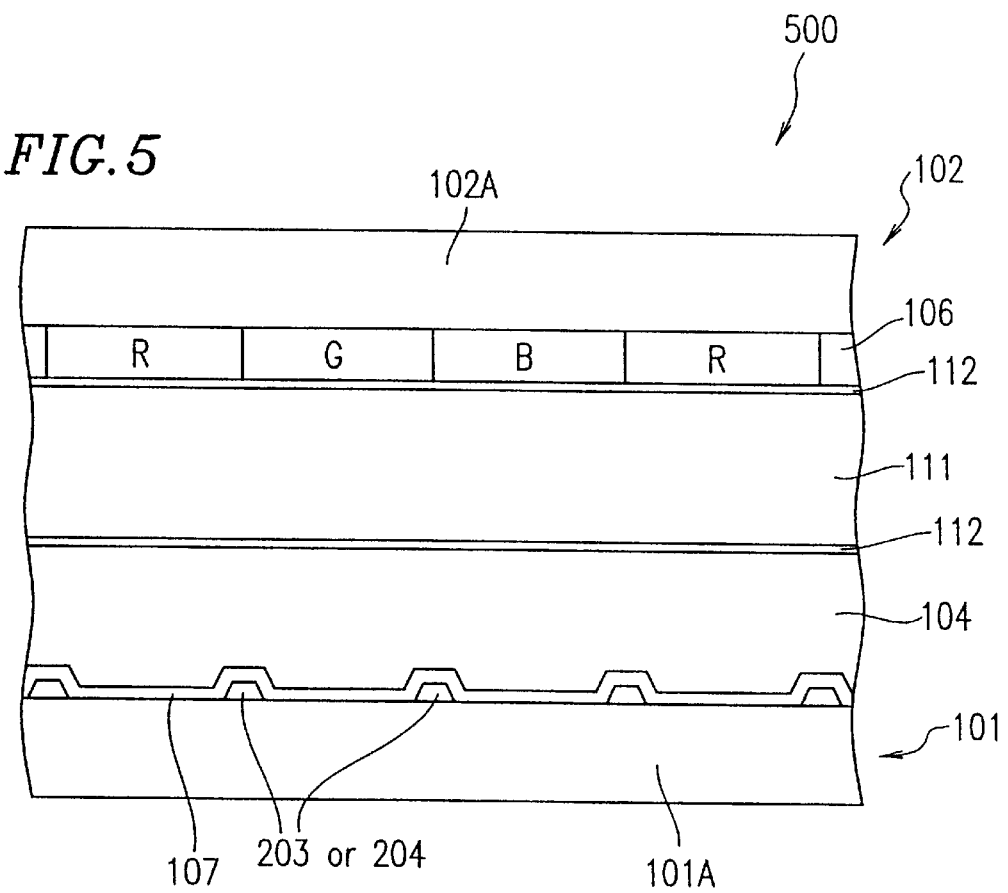
FIG. 5 is a cross-sectional view illustrating a frame region of a liquid crystal display element according to Example 2 of the present invention.

To overcome this problem, in the present example as shown in FIG. 5, the light-blocking member 110 which is not required for the display function is not provided between the signal lines (i.e., the gate signal lines 203 and the source signal lines 204), and the color layers 106 of the color filter on the CF substrate 102 will be formed so as to extend to the frame region 113, thereby reducing the area of reflection so as to suppress the overall reflection in the frame region 113.

In the peripheral region of the active matrix substrate 101 where the input terminals 114 of the source signal lines 204 are located, for example, the area of the source signal lines 204 accounted for about 20% when the light-blocking member 110 was not provided on the active matrix substrate 101. Although not outstanding, substantial surface reflection was also observed in 80% of the total area where no source signal lines 204 were provided. Although the theoretical reflectance is calculated to be about 4.7%, an actual measurement of a sample turned out to be as low as about 3.6%. Such a difference can be considered to be attributable to certain components that are present in the measured value, e.g., the transmittance of the glass substrate, interfacial surface reflection at a liquid crystal layer 111, an orientation film 112, a counter electrode (ITO) and the like, as well as interference.

The 3.6% reflectance achieved in the present example is not as low as the 0.3% reflectance of the BM according to Example 1. However, the 3.6% reflectance of the frame region according to the present example corresponds to a contrast ratio of 28:1, as opposed to a typical contrast ratio of about 10:1 to about 20:1 under an ECB mode, which is a commonly used display mode of a reflection type liquid crystal display element. Furthermore, since this region does not directly take part in the display function, the appearance of the frame region 113 has no problem in actual use of a liquid crystal display element 500.

Figure 6:
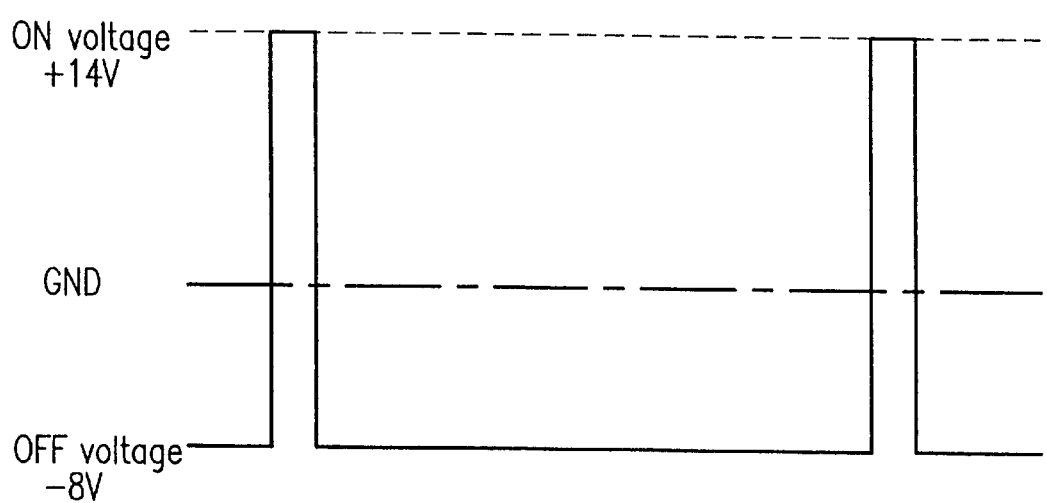
FIG. 6 is a diagram illustrating a waveform of a signal applied to gate signal lines in a typical liquid crystal display element.

While the peripheral region of the active matrix substrate 101 where the input terminals 114 of the source signal lines 204 are located has been described above, the same also applies to the peripheral region where input terminals 114 of the gate signal lines 203 are located. Furthermore, as shown in FIG. 6, a signal which is applied to the gate signal lines 203 is always at a predetermined non-zero potential (i.e., +14 V in an ON state, or −8 V in an OFF state) with respect to the counter electrode 209. As a result, the gate signal lines 203 are always in a state of a black display, and thus, the reflectance was successfully lowered to about 0.62% in an actual measurement.

Figure 7:
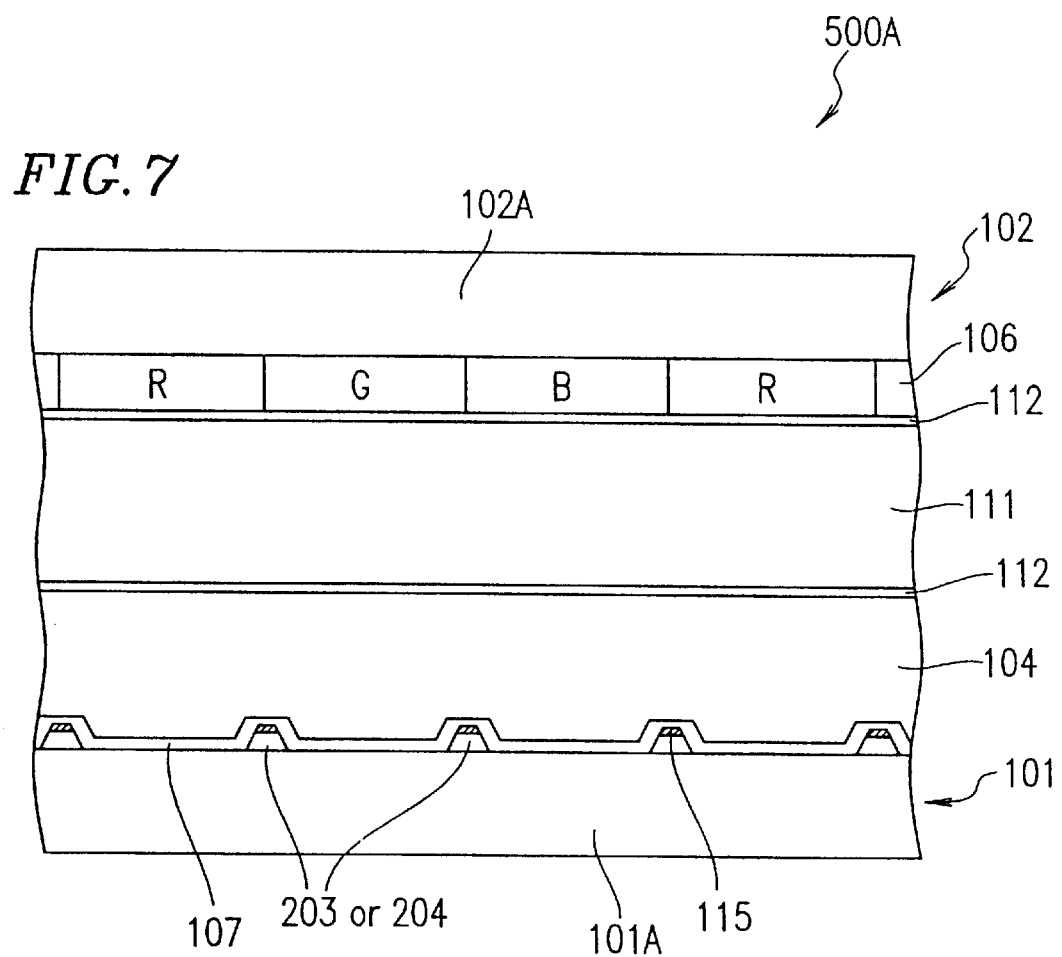
FIG. 7 is a cross-sectional view illustrating a frame region of another liquid crystal display element according to Example 2 of the present invention.

Moreover, by providing a nitride film 115 (or an oxide film) on the signal lines (i.e., the gate signal lines 203 and the source signal lines 204), as shown in FIG. 7, the reflectance of the signal lines can be lowered as in Example 1 so as to further improve the appearance of the frame region 113. According to the present example, the reflectance of a sample formed by depositing TaN on Ta was measured to be about 0.11%, which is lower than the reflectance obtained in the case where a BM is provided.

EXAMPLE 3

The present example will describe conditions for preventing a defect in the sealing material which may occur in the case where the same color layers as the color layers of the color filter are provided in the frame region 113 of the CF substrate 102.

Figure 8:
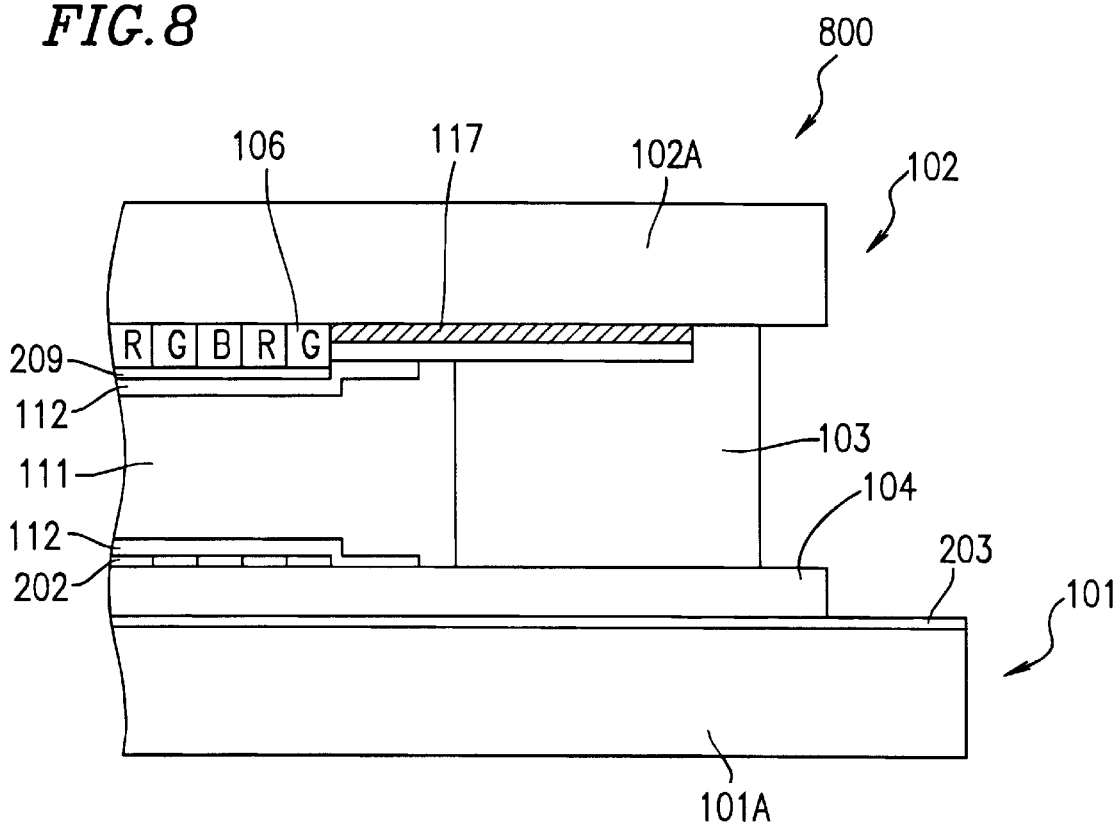
FIG. 8 is a cross-sectional view illustrating a sealing region of a conventional liquid crystal display element.

An RGB pattern 302 is provided (FIG. 9) in the region where a BM 117 would be formed in a frame region 113 of a CF substrate 102 in a conventional liquid crystal display element 800 shown in FIG. 8. The RGB pattern 302 is the same as the pattern of the color layers 106 of the color filter. The RGB pattern 302 is formed so as to extend to the frame region 113 positioned on the outer periphery of the display region 118, in the same color sequence and in the same pitch as those of R, G, and B in the display region.

Figure 9:
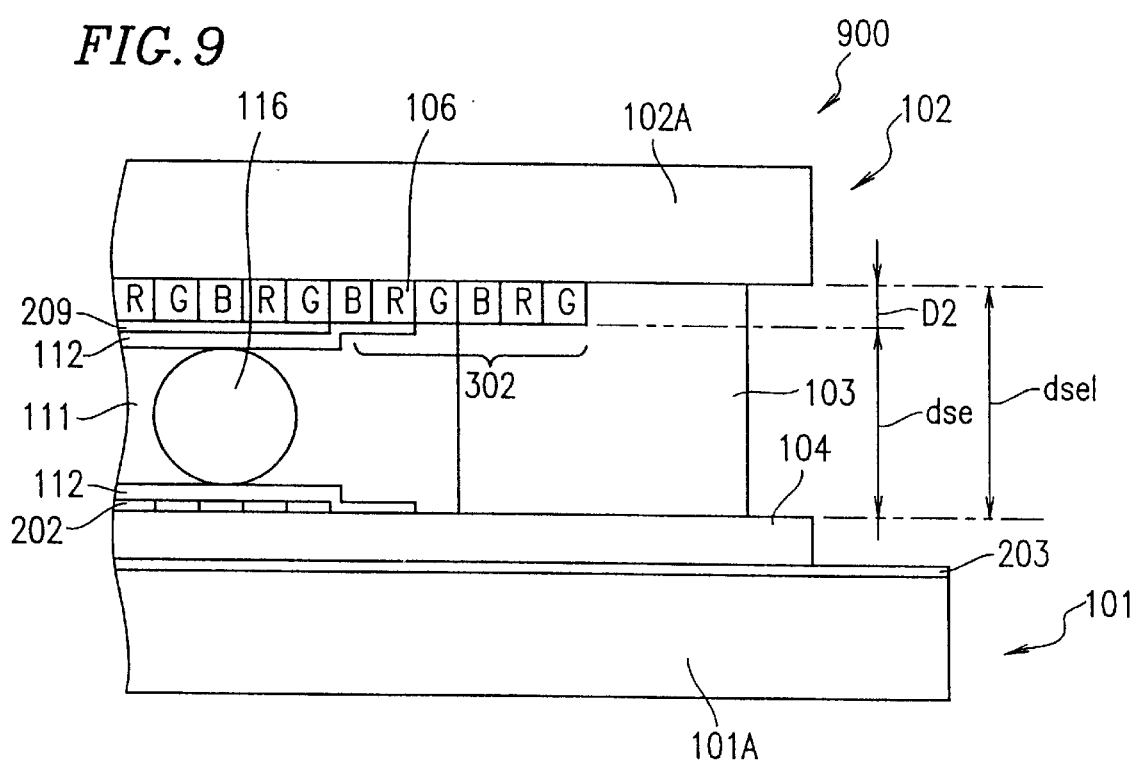
FIG. 9 is a cross-sectional view illustrating a sealing region of a liquid crystal display element according to Example 3 of the present invention.

In the case where the RGB pattern 302 in the frame region 113 is arranged so as to overlap with the sealing material 103, as shown in FIG. 9, the thickness $d_{se}$ of the sealing material 103 is smaller, by the thickness D2 of the color layer 106 on the CF substrate, than the thickness of the sealing material of the conventional liquid crystal display element 800 (FIG. 8) in which the BM 117 of a metal material is formed on the frame region 113. As a result, when the sealing material 103 is excessively compressed, a low-viscosity resin component in the sealing material 103 is separated from the additives and begins to flow. This is the same separation phenomenon as described earlier.

Accordingly, in the present example, the correlation between the incidence of defects (due to the separation phenomenon of the resin component and the additives in the sealing material 103) and the following two parameters was examined: (1) the thickness $d_{se}$ of the sealing material 103 and (2) the overlap ratio SO of the RGB pattern in the frame region 113 with respect to the sealing material 103 as parameters.

Figure 10A:
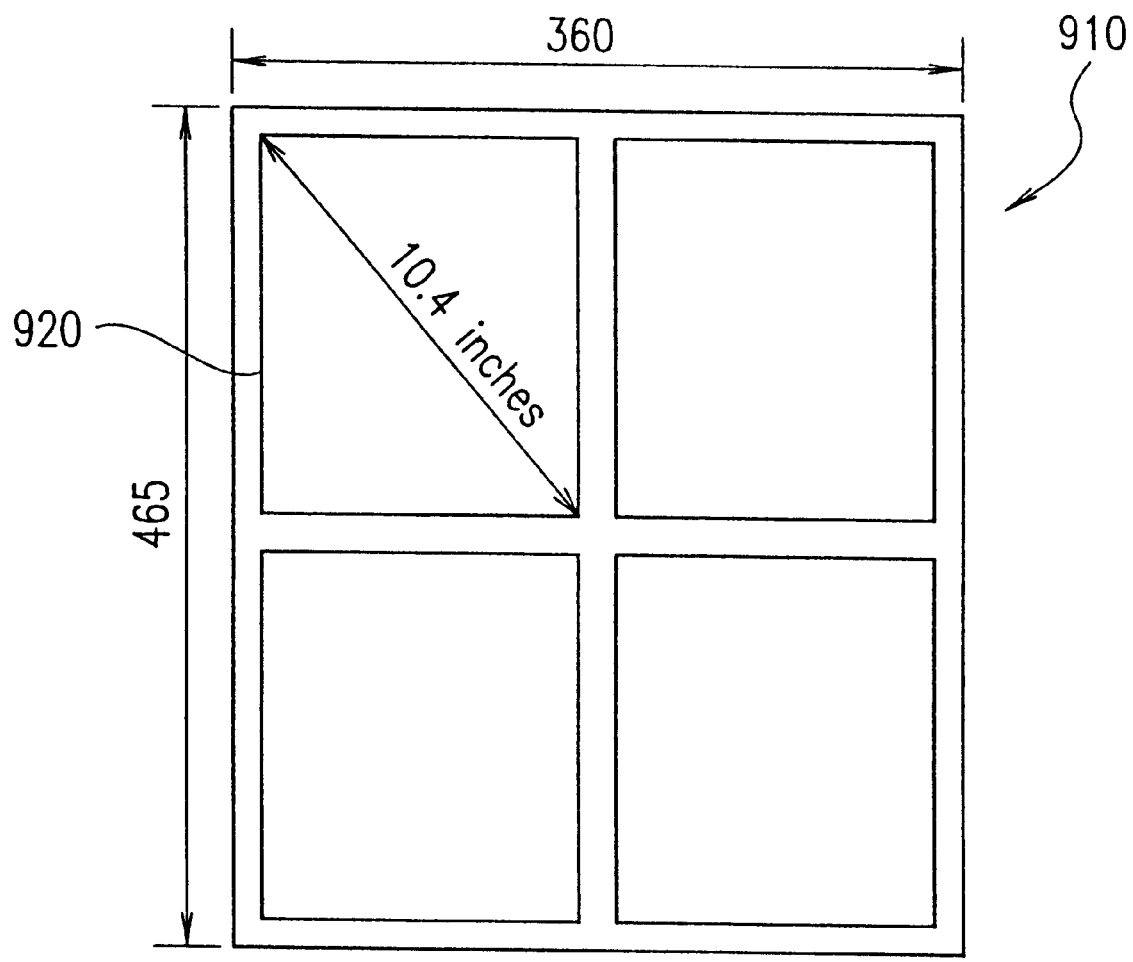
FIG. 10A is a diagram illustrating a layout on a substrate with multiple chamfers in a liquid crystal display element according to Example 3 of the present invention.

In the present example, a glass substrate 910 (Corning, #7059) of 465×360 mm with a thickness of 1.1 mm was used. Four liquid crystal display elements 920, each of which having a diagonal display size of 10.4 inches as shown in FIG. 10A, were fabricated on this glass substrate. The color layers 106 of the color filter were formed by mixing a pigment into an acrylic resin so as to have a thickness of about 1.5 µm. A thermosetting resin (Mitsui Toatsu, XN-21S) was used for the sealing material 103. The diameter of a spacer 116 (which defines the cell thickness) was prescribed as about 4.5 µm. Conditions for the attaching process were as follows: a press load of about 1200 kg; a heating speed of about 10° C./min until reaching a cure temperature of about 170° C.; and a heating duration of 60 min (after reaching about 170° C.).

The observed results of the separation phenomenon of the resin component of the sealing material 103 are shown in FIG. 10B.

It can be seen from FIG. 10B that if (1) the thickness $d_{se}$ of the sealing material 103 is such that $d_{se} \geq$ about 5 µm or (2) the overlap ratio SO of the RGB pattern 302 with respect to the sealing material 103 is such that SO≤50%, and if the portion of the sealing material where the RGB pattern 302 does not overlap has a thickness $d_{sel}$ of about 5 µm, then the above-described defect in the sealing material 103 is prevented.

Thus, in accordance with a reflection type liquid crystal display element 900 in which the CF substrate 102 includes only three layers of R, G, and B (i.e., omitting a BM), and the same RGB pattern 302 as that in the display region 118 is formed so as to extend to the frame region 113 for improved appearance (reflectance) in the frame region 113, defects in the sealing material can be prevented from occurring during the attachment process by prescribing the aforementioned range of thicknesses of the sealing material 103 and the aforementioned range of overlap ratios between the sealing material 103 and the color layers (RGB pattern 302).

It will be appreciated that the above-described condition is also applicable to a structure other than those described in the drawings, as long as it defines a liquid crystal display element in which the switching elements are formed in a matrix, the gate signal lines receiving a driving current for driving each switching element and the source signal lines for receiving a display signal are arranged to intersect each other on the active matrix substrate, and the active matrix substrate and the CF substrate are attached so as to maintain a predetermined gap therebetween via a sealing material, with liquid crystal being injected in the gap between the substrates.

EXAMPLE 4

The present example will describe practical conditions necessitated when a liquid crystal display element is produced under the conditions described in Example 3.

The actual production of a liquid crystal display element depends greatly on the patterning accuracy of the sealing material 103. For example, in the liquid crystal display element of any of Examples 1–3 above, if the line width of the sealing material 103 is prescribed as about 1 mm and a screen print method is employed for coating the sealing material 103, then the resultant patterning accuracy will generally be such that the line width has a variation of about ±0.2 mm, and the coating position has an accuracy of about 0.2 mm. In the case where the liquid crystal display element is designed so that the overlap between the sealing material 103 and the frame region 113 (the color layers 106) accounts for less than about 50% of the width of the sealing material 103, it is necessary to ensure that an overlap ratio of about 50% is attained when the sealing material 103 is offset toward the frame region by about 0.2 mm with the line width being at its maximum of 1.2 mm. Accordingly, the center position of the sealing material 103 under this design falls about 0.4 mm outside of the frame region. Such a structure is within the specified range (about 0% to about 50%) of overlap ratios between the sealing material 103 and the frame region (color layer) 113. Yet, two extreme cases may occur at about 50% and about 0%: that is, the sealing material 103 may or may not override the level difference of about 1.5 μm which corresponds to the thickness of the color layers 106 of the frame region 113.

FIG. 11 shows measurement results of the diameter of the spacers 116 provided in the sealing material 103 in the case where the liquid crystal layer 111 has a uniform thickness of about 4.5 μm, and where the thickness of the sealing material 103 and that of the liquid crystal layer 111 (i.e., cell thickness) are prescribed so that a constant distance is maintained between the opposing faces of the TFT substrate 101 and the CF substrate 102.

As can be seen from FIG. 11, the maximum diameter of the spacers is about 4.5 μm when the overlap ratio is about 50%, and about 6.0 μm when the overlap ratio is about 0%, resulting in a difference of about 1.5 μm (=about 6.0 μm−about 4.5 μm), which equals the thickness of the color layers 106. This difference exceeds about ±5% of the specified thickness of the cell, and thus such a liquid crystal display element is defective. In order to retain the cell thickness variation within about ±5% for obtaining products which are free of defects, the overlap ratio is required to be about ±10%, which is practically impossible to attain under the above-specified coating conditions for sealing material 103. However, such a requirement can be satisfied by ensuring that a total of the coating volume variation and the positioning accuracy of the sealing material 103 falls within about ±10%.

Figure 12:
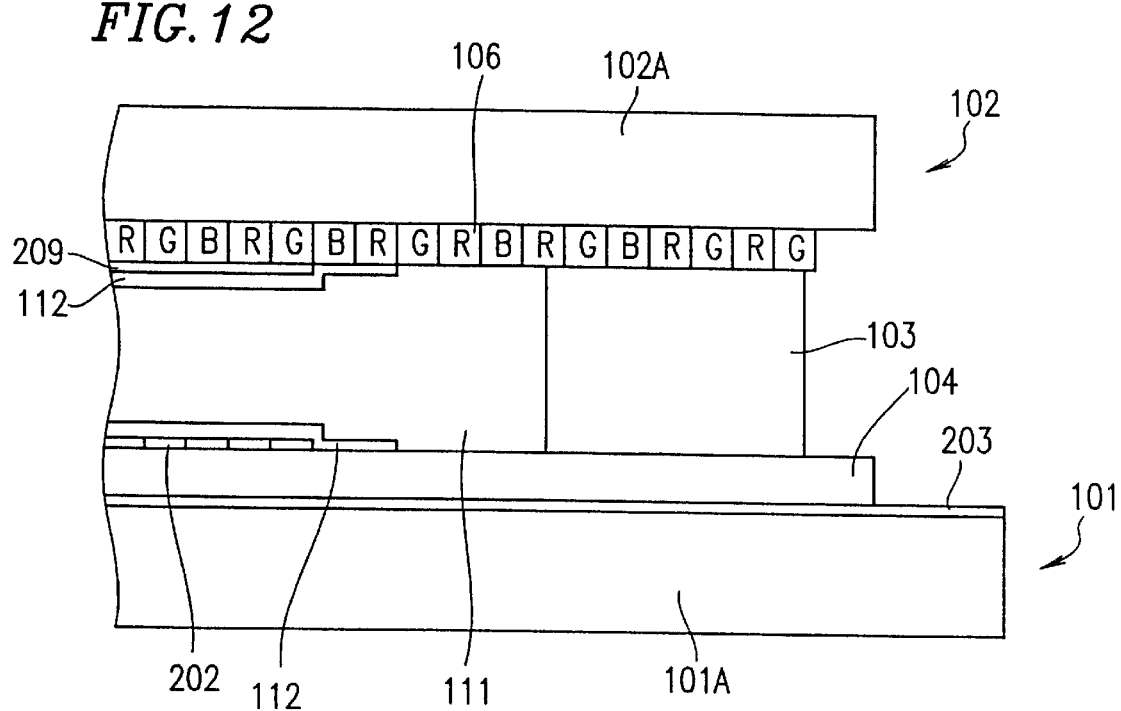
FIG. 12 is a cross-sectional view illustrating a sealing region of a liquid crystal display element according to Example 4 of the present invention.

Accordingly, in actual production, it is preferable that the sealing material 103 and the color layers 106 in the frame region 113 do not completely overlap with each other, as shown in FIG. 12. Alternatively, it is preferable to employ a structure as shown in FIG. 13 in which the thickness D1 of the sealing material 103 is at least about 5 μm or greater even if the sealing material 103 and the color layers 106 in the frame region 113 overlap with each other.

Figure 13:
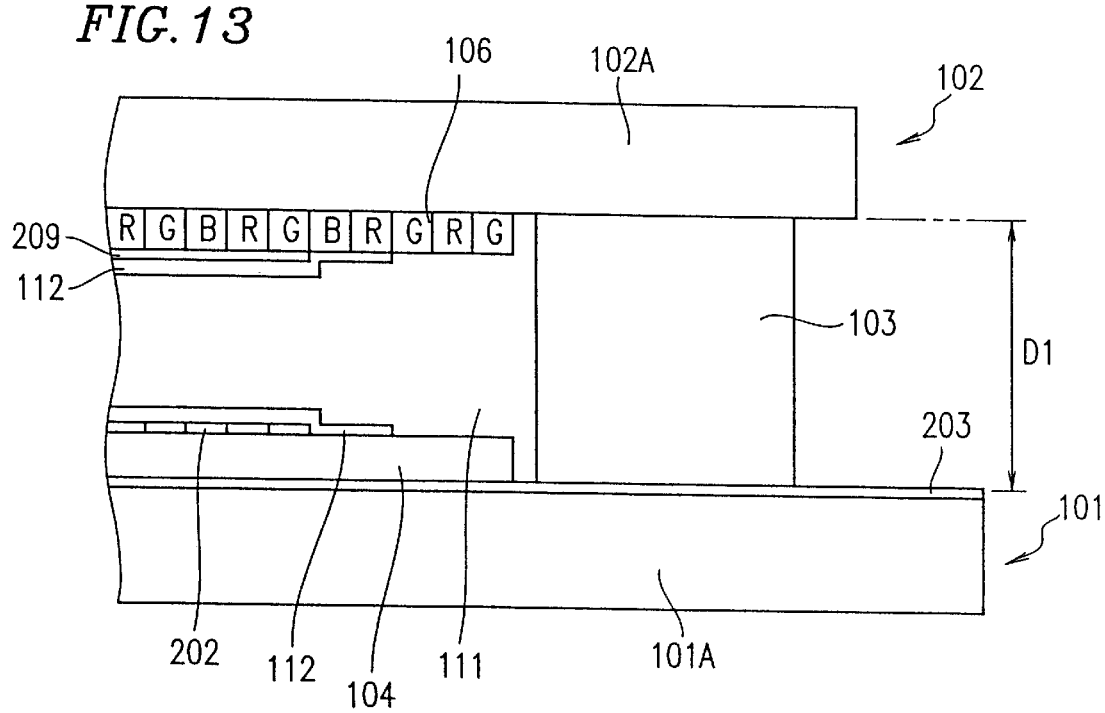
FIG. 13 is a cross-sectional view illustrating a sealing region of another liquid crystal display element according to Example 4 of the present invention.

In FIG. 13, the inter-layer insulation film 104 is completely eliminated under the sealing material 103 in order to give the sealing material 103 a thickness D1 equal to or greater than about 5 μm. Alternatively, the inter-layer insulation film 104 under the sealing material 103 can be partially eliminated so that the sealing material 103 overlaps with a portion of the inter-layer insulation film 104.

Thus, in accordance with a reflection type liquid crystal display element 900 in which the CF substrate 102 includes only three layers of R, G, and B (i.e., omitting a BM), and-the same RGB pattern 302 as that in the display region 118 is formed so as to extend to the frame region 113 for improved appearance (reflectance) in the frame region 113, defects in the sealing material can be prevented from occurring during the attachment process by prescribing the aforementioned range of thicknesses D1 of the sealing material 103 and the aforementioned range of overlap ratios between the sealing material 103 and the color layers (RGB pattern 302)

It will be appreciated that the above-described condition is also applicable to a structure other than those described in the drawings, as long as it defines a liquid crystal display element in which the switching elements are formed in a matrix, the gate signal lines receiving a driving current for driving each switching element and the source signal lines for receiving a display signal are arranged to intersect each other on the active matrix substrate, and the active matrix substrate and the CF substrate are attached so as to maintain a predetermined gap therebetween via a sealing material, with liquid crystal being injected in the gap between the substrates.

EXAMPLE 5

Figure 14:
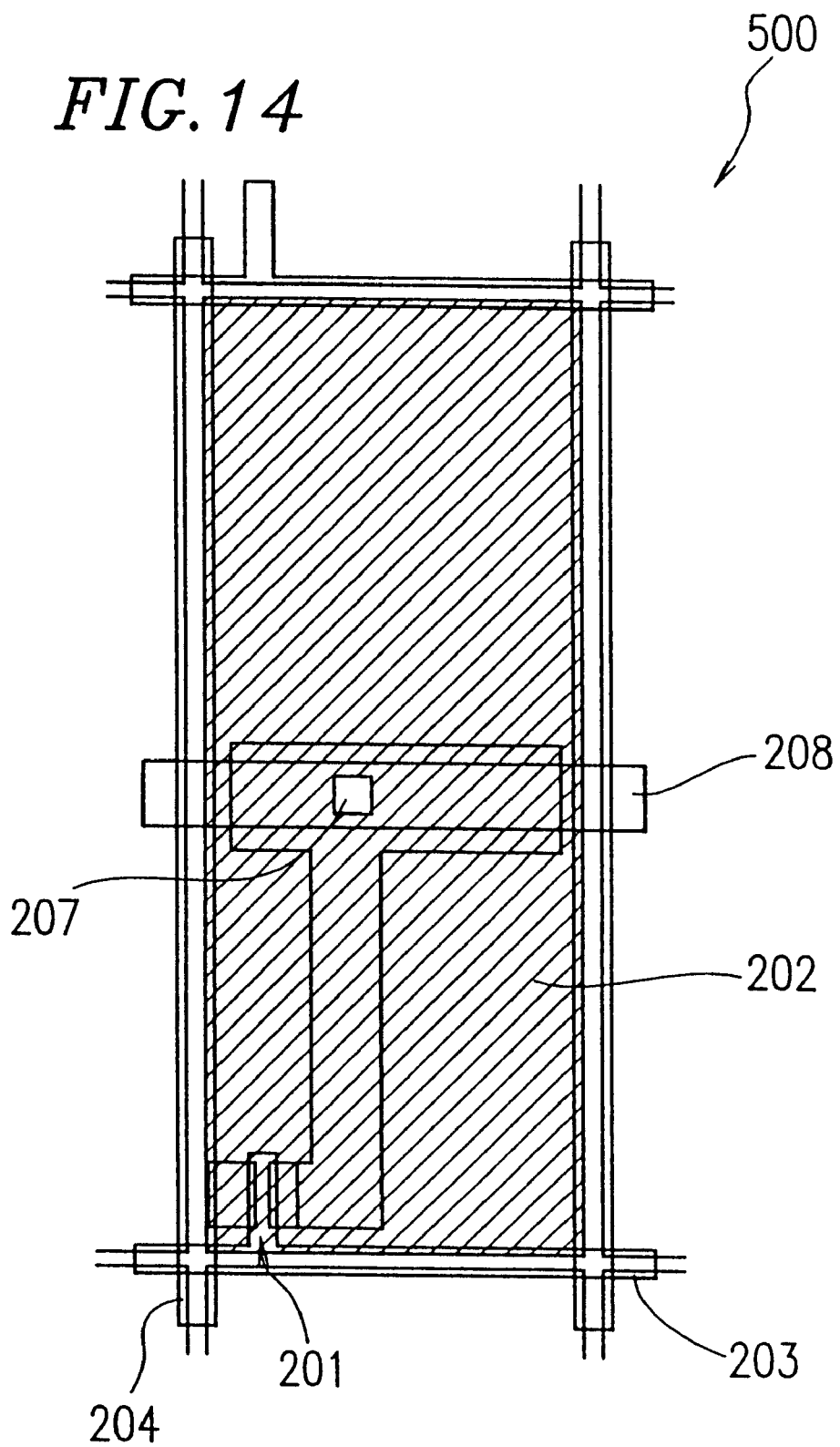
FIG. 14 is a plan view illustrating a display region of a liquid crystal display element according to Example 5 of the present invention.

In the present example, in order to protect the TFTs in the liquid crystal display element 100 according to Example 1 from external light, pixel electrodes 202 made of Al (which is a reflective conductive material) are placed in such a manner that they cover the TFTs 201 with the inter-layer insulation film 104 interposed therebetween, as shown in FIG. 14.

Figure 15:
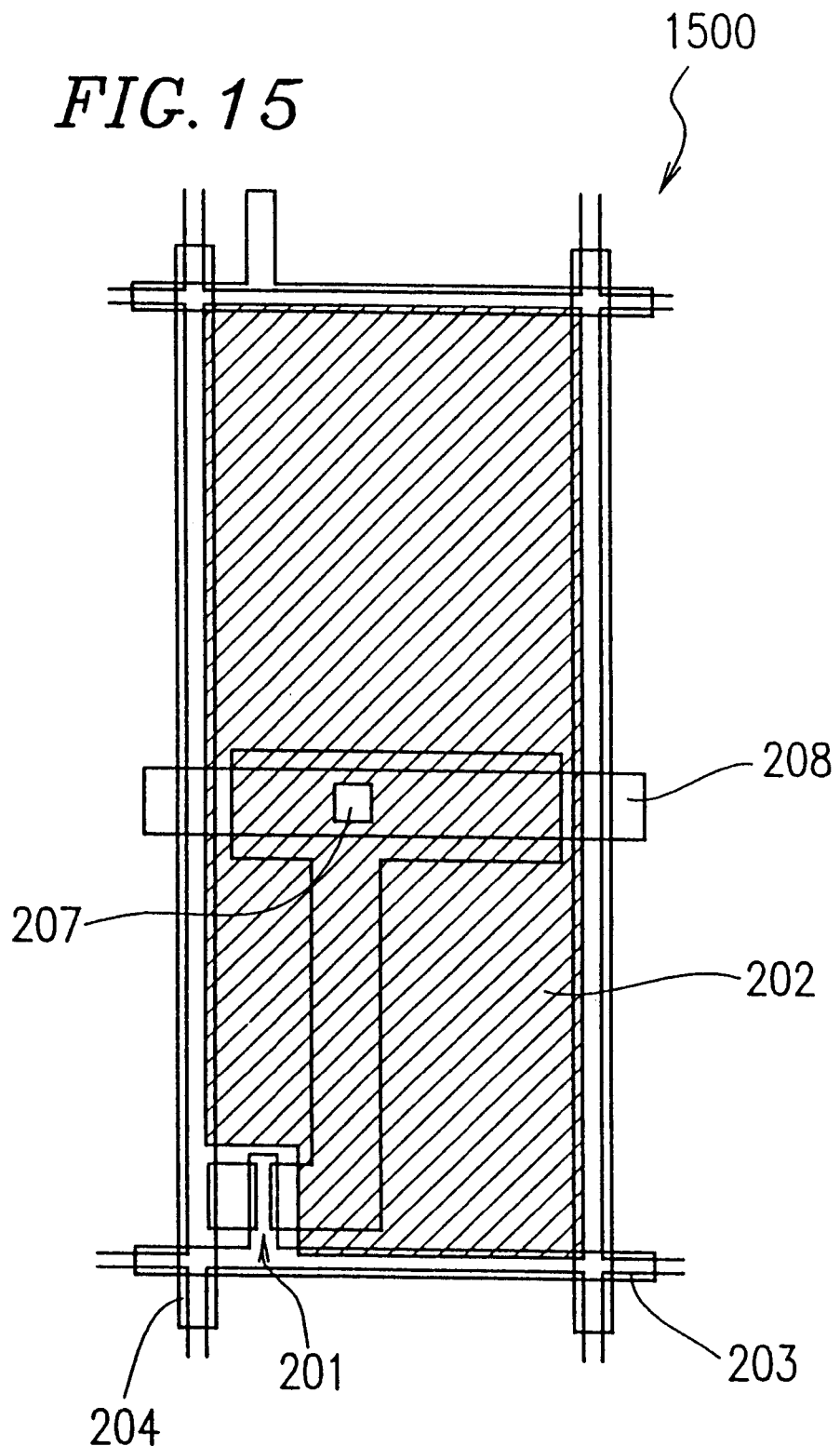
FIG. 15 is a plan view illustrating a display region of a conventional liquid crystal display element.

A displayed image on a liquid crystal display element 500 of the present example and that on a conventional reflection type liquid crystal display element 1500 as shown in FIG. 15, were compared under direct sunlight of about 50,000 lx. As shown in FIG. 15, pixel electrodes 202 of the conventional reflection type liquid crystal display element 1500 are formed so as not to cover TFTs 201. The result showed that the liquid crystal display element 500 of the present example has satisfactory display quality. On the other hand, the conventional liquid crystal display element 1500, in which the TFTs 201 are not covered by the pixel electrodes 202, exhibited some cross talk along its longitudinal direction (i.e., the direction along which source signal lines 204 extend) induced by deterioration in the off characteristics of the TFTs 201.

It is commonly known that a photo-leakage current in the channel layer 206 of the TFTs 201 depends on the wavelength of light and responds significantly to light of a short wavelength. Therefore, by depositing one layer or two layers of the color layer 106B of G (green) or the color layer 106A of R (red) on the TFTs 201 as shown in FIG. 16, reduction in the contrast can further be prevented.

Figure 16:
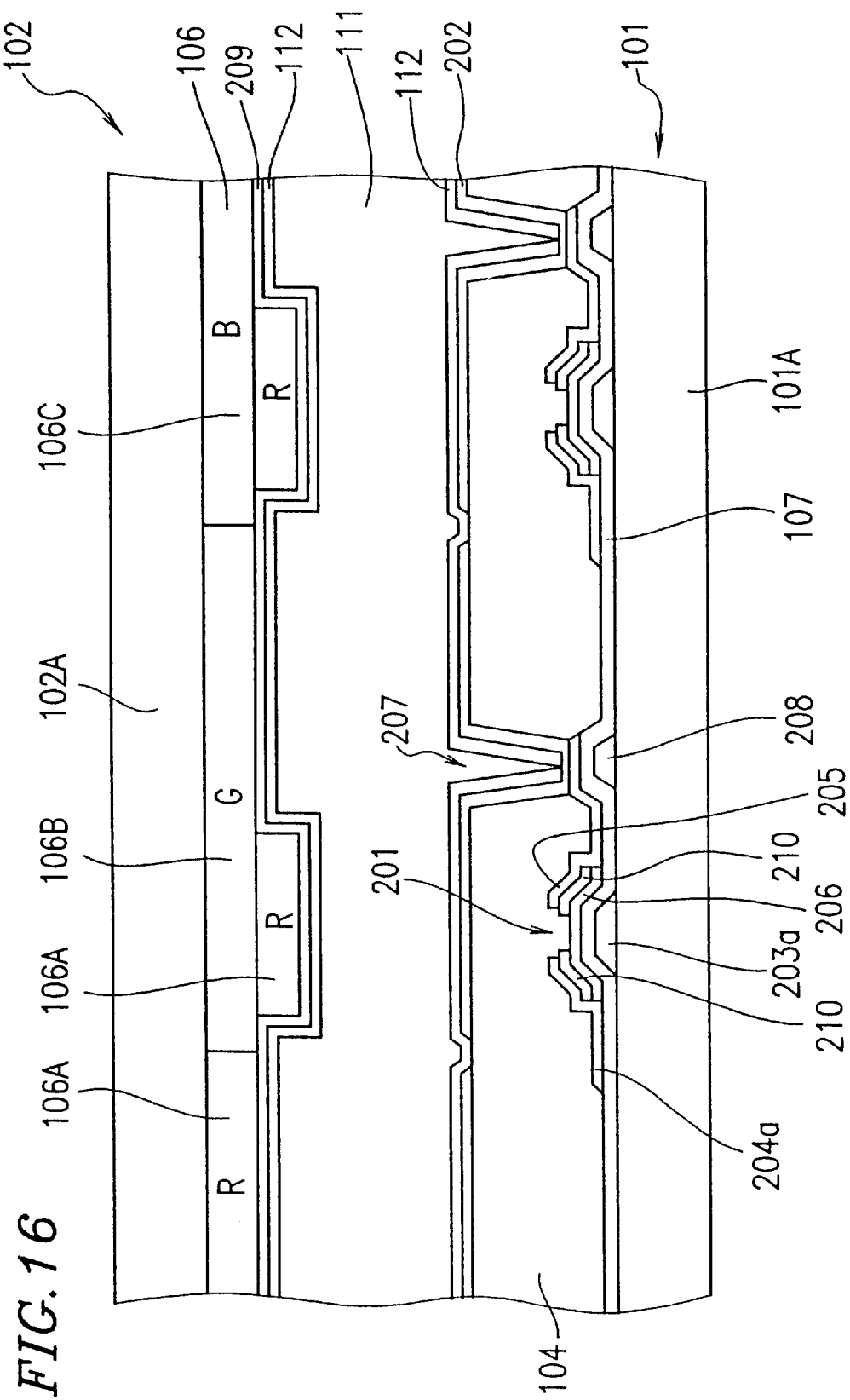
FIG. 16 is a cross-sectional view illustrating a sealing region of a liquid crystal display element according to Example 5 of the present invention.

However, in the structure shown in FIG. 16, the portion of each pixel electrode 202 which extends on the respective TFT 201 is not usable for displaying, and accordingly, the brightness of the display is decreased. Thus, the structure shown in FIG. 16 is preferably used in a very bright environment.

Although Example 5 has described the case where Al was employed as a reflective conductive material, Ag can also be used as a reflective conductive material for forming the pixel electrodes 202 to prevent deterioration of the off characteristics of the TFTs. Although the color layers 106A, 106B, and 106C of the color filter and those of the frame region 113 are composed of three layers of R, G, and B in Example 5, the present invention is similarly applicable to the case where the color filter is formed of the complementary colors of C, M, and Y.

In the above-described example, a structure in which the pixel electrodes 202 are formed of a reflective conductive material has been illustrated. However, the present invention is also applicable to a liquid crystal display element having more than two types of display modes, i.e., a transmission mode and a reflection mode, in which one pixel electrode 202 is formed of at least two or more materials such as a transparent conductive material (i.e., a conductive material having a relatively high transmittance) and a reflective conductive material (i.e., a conductive material having a relatively high reflectance). In this case, also, the CF substrate 102 can be constructed only with three layers of R, G, and B, or C, M, and Y.

Figure 17:
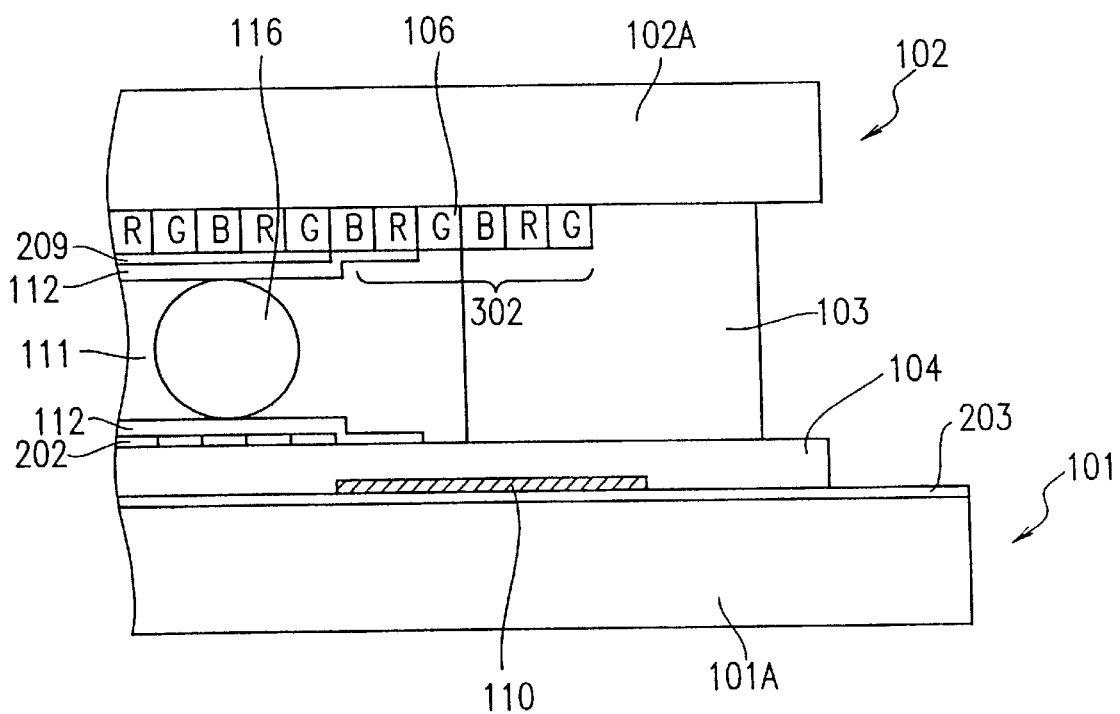
FIG. 17 is a cross-sectional view illustrating a sealing region of a liquid crystal display element according to another example of the present invention.

In the case of a liquid crystal display element having a transmission mode, the light-blocking member 110 is preferably provided on the active matrix substrate, especially in the frame region, as disclosed in Japanese Laid-Open Publication No. 10-62769. Such a light-blocking member 110 is preferably provided in a region having a wider area than the RGB pattern 302 in the frame region 113 of the above-described CF substrate 102, as shown in FIG. 17, thereby further blocking the light from a back light means that obliquely enters the liquid crystal display element due to the thickness of the glass insulative substrate.

As illustrated, according to the present invention, the CF substrate can be formed so as to include only three layers of R, G, and B, or alternatively C, M, and Y, while omitting a BM. Thus, in accordance with the present invention, it is unnecessary to employ a BM in the CF substrate which has conventionally been provided in a liquid crystal display element having a reflection type display mode for suppressing the reflection in any region irrelevant to the display function. Furthermore, according to the present invention, it is possible to substantially prevent light from being reflected in regions irrelevant to the display function (as would conventionally have been attained by a BM), as well as protecting the switching elements from external light.

The inventors of the present invention took note of the fact that the gate signal lines and the source signal lines become inevitably noticeable between adjacent pixel electrodes in the display region. First of all, by depositing a nitride film (e.g., TaN) on the metal wiring material (e.g., Ta) or depositing an oxide film (e.g., CrO) on the metal wiring material (e.g., Cr), the reflection of light on the gate signal lines and the source signal lines can be reduced. Alternatively, the signal lines can be formed by a transparent conductive film (e.g., ITO) thereby reducing the reflectance of these lines themselves. Furthermore, by arranging the color layers of color filter in such a manner that adjacent color layers overlap with each other, the light which is incident on each signal line can be reduced.

Moreover, the reflection on the signal lines in a frame region on the outer periphery of the display region can be further improved by providing the same color layers as those in the display region of the CF substrate in the frame region. Further reduction of the reflection can be achieved by adopting this feature while also lowering the reflection on the signal lines and/or employing transparent signal lines.

Furthermore, the pixel electrodes (reflection electrodes) which are formed of a conductive material such as Al, Ag or the like having a relatively high reflectance can be disposed so as to cover the TFTs, thereby protecting the TFTs from external light. Since the channel layer of the TFTs readily responds to light having a short wavelength, it becomes possible to further suppress the photo-leakage current by providing at least G or R on the TFT (in the case where the CF substrate is formed of color layers of RGB).

Conventionally, in the case where the color layer is provided in the frame region, a low-viscosity resin component within the sealing material may be separated from the additives and begin to flow in the portion where the color layers of the frame region of the sealing material overlap with the sealing material; such a phenomenon leads to a defect. The present invention defines the thickness of the sealing material and the overlap ratio between the color layers of the frame region and a width of the sealing material, whereby such defects can be prevented.

According to the present invention, it is possible to construct the CF substrate 102 so as to include only three layers of R, G, and B, or C, M, and Y, even in the case where the liquid crystal display element is constructed so as to have two or more types of display modes, e.g., a transmission mode and reflection mode, such that one pixel electrode is formed of at least two or more materials, e.g., a transparent conductive material (conductive material with a relatively high reflectance) and a reflective conductive material (conductive material with a relatively high reflectance).

In the case of a liquid crystal display element having a transmission type mode, the light-blocking member is preferably provided on the active matrix substrate, especially in the frame region, and is preferably provided in a region having a wider area than the color layers of the frame region on the above-described CF substrate. In such a structure, the display quality can be improved by further blocking the light from a back light means which is incident on each signal line obliquely due to the thickness of the glass insulative substrate.

Thus, by constructing a liquid crystal display element according to the method illustrated above, it becomes possible to omit a BM, which is conventionally provided on the CF substrate, thereby providing a CF substrate which includes only three layers of R, G, and B, or C, M, and Y. As a result, the production cost of the CF substrate is significantly reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display element including a display mode of a reflective type, comprising:

a matrix of reflective pixel electrodes of reflective conductive material, and corresponding switching elements in communication with the pixel electrodes;

an active matrix substrate and a color filter substrate attached together by a sealing material, and a gap being defined therebetween into which liquid crystal material is injected;

said active matrix substrate including a gate signal line by which a driving signal to drive one of the switching elements is input, and a source signal line crossing said gate signal line and by which a display signal is input;

said color filter substrate including a color filter having a color layer of a plurality of colors;

wherein said color layer of said color filter is formed with the same pattern and same pitch and with the same material in both a display region and in a frame region on the outer periphery of the display region within the color filter substrate;

wherein the sealing material attaching said substrates together overlaps the color layer of the color filter on the color filter substrate via an overlapping width less than 50% of the width of the sealing material, and a thickness of the sealing material overlapping the color layer is more than 5 μm.

2. The liquid crystal display element of claim 1, wherein at least a portion of the color layer of the color filter overlaps with at least one of said gate signal line and said source signal line.

3. The liquid crystal display element of claim 1, wherein one of said pixel electrodes is formed so as to cover one of said switching elements.

4. The liquid crystal display element of claim 1, wherein said color layer of said color filter includes red, green and blue colors, and at least one or two color layers of red and/or green is/are provided on each of the color layers over the switching elements.

5. The liquid crystal display element of claim 1, wherein at least one of the gate signal line and the source signal line comprises a transparent conductive film.

6. The liquid crystal display element of claim 1, wherein at least one or two films selected from a nitride film and an oxide film each including a light-transmissiveness is provided on at least one of the gate signal line and the source signal line.

7. The liquid crystal display element of claim 1, wherein the color layer in the frame region has the same repeated order of color as that of the color layer of the color filter in the display region, and is formed with the same pitch.

8. The liquid crystal display element of claim 1, wherein at least one of the pixel electrodes comprises both a reflective conductive material and a transparent conductive material.

9. The liquid crystal display element of claim 8, wherein the active matrix substrate further comprises a light-blocking member.

10. The liquid crystal display element of claim 9, wherein the light blocking member is located within an area lower than the color layer in the frame region of the color filter substrate.

11. The liquid crystal display element of claim 1, wherein the sealing material comprises a resin including a property of being cured by heat or ultraviolet (UV) light, wherein the resin is mixed with fillers and spacers.

12. The liquid crystal display element of claim 11, wherein the sealing material has a thickness more than two times the diameter of filler mixed therewith.

13. The liquid crystal display element of claim 1, wherein the color layer of the color filter overlapping the sealing material has a thickness of about 1.5 μm.

14. The liquid crystal display element of claim 1, wherein an interlayer insulating film is formed on the active matrix substrate, and the interlayer insulating film within a region where the sealing material is formed on the active matrix is partially or fully deleted.

15. A liquid crystal display element including a display mode of a reflective type, comprising:

a matrix of reflective pixel electrodes of reflective conductive material, and corresponding switching elements in communication with the pixel electrodes;

an active matrix substrate and a color filter substrate attached together by a sealing material, and a gap being defined therebetween into which liquid crystal material is injected;

said active matrix substrate including a gate signal line by which a driving signal to drive one of the switching elements is input, and a source signal line overlapping said gate signal line and by which a display signal is input;

said color filter substrate including a color filter having a color layer of a plurality of colors;

wherein said color layer of said color filter is formed with the same pattern and same pitch and with the same material in both a display region and in a frame region on the outer periphery of the display region within the color filter substrate;

wherein the sealing material attaching said substrates together overlaps the color layer of the color filter on the color filter substrate via an overlapping width less than 50% of the width of the sealing material, and a thickness of the sealing material overlapping the color layer is more than 5 μm; and wherein at least one of the gate signal line and the source signal line comprises a transparent conductive film.

16. A liquid crystal display element including a display mode of a reflective type, comprising:

a matrix of reflective pixel electrodes of reflective conductive material, and corresponding switching elements in communication with the pixel electrodes;

an active matrix substrate and a color filter substrate attached together by a sealing material, and a gap being defined therebetween into which liquid crystal material is injected;

said active matrix substrate including a gate signal line by which a driving signal to drive one of the switching elements is input, and a source signal line overlapping said gate signal line and by which a display signal is input;

said color filter substrate including a color filter having a color layer of a plurality of colors;

wherein said color layer of said color filter is formed with the same pattern and same pitch and with the same material in both a display region and in a frame region on the outer periphery of the display region within the color filter substrate;

wherein the sealing material attaching said substrates together overlaps the color layer of the color filter on the color filter substrate via an overlapping width less than 50% of the width of the sealing material, and a thickness of the sealing material overlapping the color layer is more than 5 μm; and wherein at least one film selected from a nitride film and an oxide film each including light-transmissiveness is provided on at least one of the gate signal line and the source signal line.

* * * * *